United States Patent
Lewis et al.

(10) Patent No.: US 10,791,188 B2
(45) Date of Patent: Sep. 29, 2020

(54) DIGITAL COMPONENT TRANSMISSION

(71) Applicant: Google LLC, Mountain View, CA (US)

(72) Inventors: Justin Lewis, Marina del Rey, CA (US); Thomas Graham Price, San Francisco, CA (US)

(73) Assignee: Google LLC, Mountain View, CA (US)

( * ) Notice: Subject to any disclaimer, the term of this patent is extended or adjusted under 35 U.S.C. 154(b) by 34 days.

(21) Appl. No.: 15/685,162

(22) Filed: Aug. 24, 2017

(65) Prior Publication Data

US 2019/0068733 A1   Feb. 28, 2019

(51) Int. Cl.
G06F 15/16  (2006.01)
H04L 29/08  (2006.01)
G06N 7/00   (2006.01)
H04L 29/06  (2006.01)

(52) U.S. Cl.
CPC ............. *H04L 67/26* (2013.01); *G06N 7/005* (2013.01); *H04L 67/10* (2013.01); *H04L 67/20* (2013.01); *H04L 67/2838* (2013.01); *H04L 67/42* (2013.01)

(58) Field of Classification Search
CPC ..... H04L 67/26; H04L 67/20; H04L 67/2838; H04L 67/10; H04L 67/42; G06N 7/005
USPC ........................................................ 709/217
See application file for complete search history.

(56) References Cited

U.S. PATENT DOCUMENTS

| | | |
|---|---|---|
| 6,564,192 B1 | 3/2003 | Kinney, Jr. et al. |
| 7,788,159 B1 | 4/2010 | Sack et al. |
| 8,311,885 B2 | 11/2012 | Kennedy et al. |
| 8,412,575 B2 | 4/2013 | Labio et al. |
| 2005/0033572 A1* | 2/2005 | Jin .......................... G10L 15/20 704/246 |
| 2009/0099904 A1 | 4/2009 | Affeld et al. |
| 2009/0234710 A1 | 9/2009 | Belgaied Hassine et al. |
| 2010/0223141 A1 | 9/2010 | Spencer et al. |

(Continued)

OTHER PUBLICATIONS

PCT International Search Report and Written Opinion issued in International Application No. PCT/US2018/028372, dated Jul. 17, 2018, 14 pages.

(Continued)

*Primary Examiner* — Umar Cheema
*Assistant Examiner* — Anh Nguyen
(74) *Attorney, Agent, or Firm* — Fish & Richardson P.C.

(57) ABSTRACT

Methods, systems, and apparatus, including computer programs encoded on a computer storage medium, for adjusting an eligibility value for transmitting a digital component. In one aspect, a computing system includes a server for identifying opportunities to transmit digital components to client devices. The server determines a first probability of a given outcome occurring following user interaction with the digital component when the digital component is transmitted to the client device. The server determines a second probability of the given outcome occurring if the digital component is not transmitted to the client device. The server generates an outcome incrementality factor for the digital component, including determining a ratio of the first probability relative to the second probability, and triggers adjustment of an eligibility value based on the outcome incrementality factor. The server then controls transmission of the digital component to the client device using the adjusted eligibility value.

22 Claims, 4 Drawing Sheets

(56) References Cited

U.S. PATENT DOCUMENTS

| | | | | |
|---|---|---|---|---|
| 2012/0089456 A1* | 4/2012 | Gupta | ................ | G06O 30/0246 |
| | | | | 705/14.45 |
| 2013/0297438 A1 | 11/2013 | Louie | | |
| 2015/0317670 A1 | 11/2015 | Cavander et al. | | |
| 2016/0027041 A1 | 1/2016 | Zhong et al. | | |
| 2016/0239868 A1* | 8/2016 | Demsey | ................ | H04W 4/029 |
| 2016/0358229 A1* | 12/2016 | Bhalgat | ................... | H04L 51/32 |
| 2017/0140437 A1* | 5/2017 | Bhat | ................ | G06Q 30/0269 |
| 2018/0365580 A1* | 12/2018 | Musuvathi | ............. | G06N 20/00 |

OTHER PUBLICATIONS

PCT International Preliminary Report on Patentability in International Application No. PCT/US2018/028372, dated Feb. 25, 2020, 9 pages.

\* cited by examiner

DIGITAL COMPONENT TRANSMISSION

BACKGROUND

This specification relates to data processing and system modeling of techniques used to transmit digital components over a communications network.

The Internet facilitates the exchange of information between users across the globe. This exchange of information enables distribution of content to a variety of users. In some situations, content from multiple different providers can be integrated into a single electronic document to create a composite document. For example, a portion of the content included in the electronic document may be selected (or specified) by a publisher of the electronic document. A different portion of content (e.g., digital component) can be provided by a third-party (e.g., an entity that is not a publisher of the electronic document and/or does not have access to modify code defining the electronic document).

In some situations, the digital component is selected for integration with the electronic document after presentation of the electronic document has already been requested and/or while the electronic document is being rendered. For example, machine executable instructions included in the electronic document can be executed by a client device when the electronic document is rendered at the client device. The executable instructions can enable the client device to contact one or more remote servers to obtain a digital component that will be integrated into the electronic document while presented at the client device.

SUMMARY

One aspect of the subject matter described in this specification can be embodied in a computer-implemented method. The method includes identifying, by a back-end computing server, an opportunity to transmit a digital component to a client device; determining, by the back-end computing server, a first probability of a given outcome occurring following user interaction with the digital component assuming that the digital component is transmitted to the client device in response to the identified opportunity; and determining, by the back-end computing server, a second probability of the given outcome occurring assuming that the digital component is not transmitted to the client device in response to the identified opportunity.

The method also includes, generating, by the back-end computing server, an outcome incrementality factor for the digital component, including determining a ratio of the first probability relative to the second probability; triggering, by the back-end computing server, adjustment of an eligibility value that controls transmission of the digital component based on the outcome incrementality factor for the digital component; and controlling, by the back-end computing server, transmission of the digital component to the client device using the adjusted eligibility value.

These and other implementations can each optionally include one or more of the following features. For example, in some implementations, generating the outcome incrementality factor includes determining an extent to which transmission of the digital component changes a probability that the user will perform an action that results in the given outcome.

In some implementations, the back-end computing server includes multiple different predictive modeling systems, and determining the first probability and the second probability includes: generating, by a first predictive modeling system, a first parameter that indicates the parameter value for the first probability; and generating, by a second predictive modeling system, a second parameter that indicates the parameter value for the second conversion probability.

In some implementations, determining the first probability of the given outcome occurring includes: determining, by a first model, an interaction probability that quantifies a probability that user interaction with the digital component will occur if the digital component is transmitted to the client device in response to the identified opportunity; determining, by a second model, a post-interaction outcome probability that quantifies a probability that the given outcome occurs following the user interaction with the digital component if the digital component is transmitted to the client device in response to the identified opportunity; and determining the first probability as a product of the interaction probability and the post-interaction outcome probability.

In some implementations, determining the second probability of the given outcome includes determining, by a third model, a baseline probability that quantifies a probability that the given outcome occurs absent transmission of the digital component in response to the identified opportunity; and generating the outcome incrementality factor includes dividing the first probability by the baseline probability.

In some implementations, the method further includes: determining, by the back-end computing server and based on the first parameter, a first score for the given outcome in response to transmitting the digital component to the client device; determining, by the back-end computing server and based on the second parameter, a second score for the given outcome absent transmission of the digital component to the client device; and generating, by the back-end computing server, an incrementality score based on a difference between the first score and the second score.

In some implementations, the eligibility value corresponds to a particular target score, and triggering adjustment of the eligibility value includes: determining a difference between the incrementality score and the particular target score; and adjusting the eligibility value to achieve the particular target score based on the difference between the incrementality score and the particular target score.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

Particular embodiments of the subject matter described in this specification can be implemented so as to realize one or more of the following advantages. According to the described subject matter, distribution of a digital component can be triggered using probabilities determined using machine learning systems. In particular, the probabilities of a given outcome can be used to determine whether to trigger distribution of a digital component that directs a user to a publisher's web site in response to user interaction with the digital component.

For example, a first probability can indicate a likelihood that a given outcome will occur after the user is directed to the publisher's website through interaction with the digital component (assuming that distribution of the digital component is triggered), and the second probability can indicate a likelihood that the given outcome will occur even if the digital component is not distributed to the user (i.e., the distribution is not triggered). Triggers for distribution of the digital component can be set based on a computed relationship involving the first and second probabilities (e.g., a difference between the probabilities, or a ratio of one probability relative to another probability).

Using the computed relationship to trigger distribution of the digital component helps to reduce (or eliminate) transmission of the digital component in situations that the given outcome is going to occur irrespective of whether the digital component is transmitted. This can prevent unnecessary distribution of the digital component, which reduces the computational resources required to obtain the given outcome. As such, the described technology improves the efficiency of the computer system operation, which is an improvement to the computer system itself. Hence, operation of the system itself is improved by providing more efficient processes for controlling transmission of digital components.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
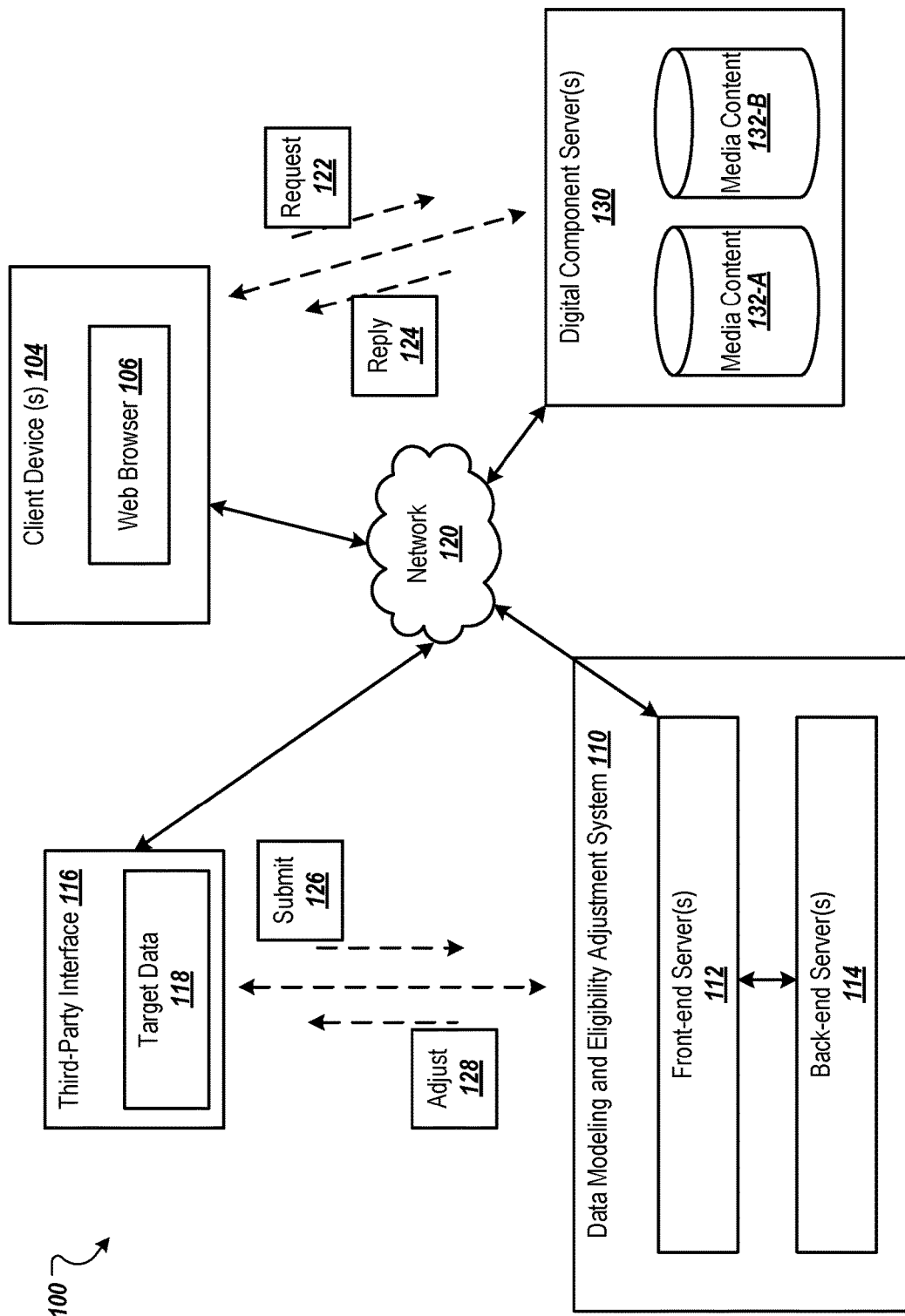
FIG. 1 is a block diagram of an example computing environment in which content is distributed.

This document discloses methods, systems, apparatus, and computer readable media that facilitate data processing and system modeling of techniques used to transmit digital components over a communications network. As discussed in more detail below, a machine learning system executes predictive models for determining probabilities that a given outcome will occur if a given digital component is transmitted in response to a particular request for content that is received from a client device. The given outcome can be specified (or selected) as appropriate for the environment in which the technology discussed throughout this document is implemented.

For example, the given outcome in the context of the internet can be a publisher specified user action (e.g., downloading specified content, completing a transaction, interacting with a specific icon, widget, or application, launching a specific script, or some other specified action) being performed at the publisher's website. The probabilities of the given outcome can be used to determine whether to trigger distribution of a digital component that directs the user to the publisher's website in response to user interaction with the digital component.

In some implementations, the determination as to whether to trigger distribution of the digital component in response to a particular request (and/or the outcome value/score that should be obtained for the distribution) can be based on a difference between the probability that the given outcome will occur after the user is directed to the publisher's website through interaction with the digital component (assuming that distribution of the digital component is triggered), and the probability that the given outcome will occur even if the digital component is not distributed to the user (i.e., the distribution is not triggered).

For example, the machine learning system can determine a first probability that the given outcome will occur following user interaction with the digital component assuming that the digital component is transmitted for presentation in a webpage responsive to the request. The machine learning system can also determine a second probability that the given outcome will occur assuming that the digital component is not transmitted for presentation in the webpage.

In some implementations, distribution of the digital component may not be triggered (e.g., distribution is prevented) when the first probability does not exceed the second probability by at least a specified amount. In some implementations, the outcome value that is required for distribution of the digital component can be set based on the amount by which the first probability exceeds the second probability. For example, the outcome value required to be submitted by the publisher can increase as the first probability increases relative to the second probability.

Using the difference between the first probability and the second probability as a basis or condition for triggering distribution of a digital component helps to reduce (or eliminate) transmission of the digital component in situations that the given outcome is going to occur irrespective of whether the digital component is transmitted, which can prevent unnecessary distribution of the digital component, thereby reducing the computational resources required to obtain the given outcome. As such, the technology described in this document improves the efficiency of the computer system operation, which is an improvement to the computer system itself.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. The phrase "digital component" can refer to a portion of digital content that is embedded into an electronic document that is provided by an entity different from the provider of the digital component.

FIG. 1 is a block diagram of an example environment 100 in which digital components are distributed for presentation with electronic documents. The example environment 100 includes a network 120, such as a local area network (LAN), a wide area network (WAN), the Internet, or a combination thereof. The network 120 connects client devices 104, modeling system 110, third party interface 116, and digital component servers 130. The example environment 100 may include many different user/client devices 104 that can receive a variety of electronic documents that include multiple types of digital components transmitted by digital component servers 108.

A client device 104 is an electronic device that is capable of requesting and receiving resources over the network 120. Example client devices 104 include personal computers, mobile communication devices, and other devices that can send and receive data over the network 120. A client device 104 typically includes a user application, such as a web browser 106, to facilitate the sending and receiving of data over the network 120. Native applications executed by the client device 104 can also facilitate the sending and receiving of data over the network 120.

An electronic document is data that presents a set of content at a client device 104. Examples of electronic documents include webpages, word processing documents, portable document format (PDF) documents, images, videos, search results pages, and feed sources. Native applications (e.g., "apps"), such as applications installed on mobile, tablet, or desktop computing devices are also examples of electronic documents. Electronic documents can be provided to client devices 104 by an example electronic document servers or from an application server that provides content to a native application. In some implementations, a conversational response from a voice-powered assistant device, or from a virtual assistant application, is an electronic document for presenting content at client device 104.

For example, the electronic document servers can include servers that host publisher websites. In this example, the client device 104 can initiate a request for a given publisher webpage, and the electronic server that hosts the given publisher webpage can respond to the request by sending machine executable instructions that initiate presentation of the given webpage at the client device 104. In another example, the electronic document servers can include app servers from which client devices 104 can download apps. In this example, the client device 104 can download files required to install an app at the client device 104, and then execute the downloaded app locally. Note that while the description refers to "requests" for purposes of example, the techniques described in this document are deeply applicable to other opportunities to provide content that do not require a request to be submitted by the client device 104.

Electronic documents can include a variety of content. For example, an electronic document can include static content (e.g., text or other specified content) that is within the electronic document itself and/or does not change over time. Electronic documents can also include dynamic content that may change over time or on a per-request basis. For example, a publisher of a given electronic document can maintain a data source that is used to populate portions of the electronic document.

In this example, the given electronic document can include a tag or script that causes the client device 104 to request content from the data source when the given electronic document is processed (e.g., rendered or executed) by a client device 104. The client device 104 integrates the content obtained from the data source into the given electronic document to create a composite electronic document including the content obtained from the data source.

In some situations, a given electronic document can include a digital component tag or digital component script. In these situations, the digital component tag or digital component script is executed by the client device 104 when the given electronic document is processed by the client device 104. Execution of the digital component tag or digital component script causes the client device 104 to generate a request for digital components (referred to as a "component request 122"), which is transmitted over the network 120 to the digital component server 130. In some implementations, rather than executing a digital tag or script to request digital components from a third-party system, digital components and other third-party content can be requested and incorporated at a first party content server (e.g., server-side or publisher server)

For example, the digital component tag or digital component script can enable the client device 104 to generate a packetized data request including a header and payload data. The component request can include event data specifying features such as a name (or network location) of a server from which the digital component is being requested, a name (or network location) of the requesting device (e.g., the client device 104), and/or information that the digital component server 130 can use to select one or more digital components provided in response (e.g., as a "reply 124") to the component request 122.

Digital component server 130 selects digital components that may include items of media content (e.g., video files, audio files, images, or text, and combinations thereof, which can all take the form of advertising content, e.g., 132-A, or non-advertising content, e.g., 132-B) that will be presented with a given electronic document in response to receiving the component request and/or using information included in the component request.

Modeling system 110 includes a front-end server 112 and a back-end server 114. In some implementations, modeling system 110 may be a data modeling and eligibility value adjustment system. For example, system 110 can use data models to determine probability values for predicting the occurrence of a given outcome. The system 110 can then use these probability values to trigger adjustment of an eligibility value that controls transmission of digital components from digital component server 130 to client device 104, as discussed in more detail below.

Generally, digital components are transmitted based on some eligibility value. For example, the eligibility value can be based on how relevant distribution criteria for particular digital component is to a search query submitted by a client device 104, or content of an electronic document being provided to the client device 104. In some situations, the eligibility value can also be based on how likely it is that a given outcome (e.g., a specified user interaction occurring at a landing page that is linked to by the digital component) will occur when the digital component is distributed in response to a request.

However, the likelihood of the given outcome occurring when the digital component is distributed does not take into account or differentiate between the likelihood that the given outcome would have occurred in the absence of the digital component being distributed. In other words, basing the eligibility value on the likelihood that the given outcome will occur if the digital component is distributed does not provide information regarding the incremental increase in the likelihood of occurrence of the given outcome that is caused by the distribution of the digital component.

As such, systems that base the eligibility value on the likelihood of the given outcome occurring when the digital component is distributed do not consider the incremental increase in the likelihood that is caused by the distribution of the digital component, which can lead to distribution of the digital component even in situations where the likelihood of the given outcome occurring does not significantly change irrespective of whether the digital component is distributed or not. For brevity, the likelihood of the given outcome occurring will be referred to as the "outcome likelihood."

The techniques described in this document take into account the incremental outcome likelihood that is provided by distribution of the digital component for purposes of determining whether to distribute the digital component and/or the outcome value that should be submitted for distribution of the digital component. The phrase "incremental outcome likelihood" refers to an amount by which the outcome likelihood changes because of a specified action. For example, the incremental outcome likelihood provided by distribution of the digital component refers to an amount by which the outcome likelihood differs when the digital component is distributed relative to the outcome likelihood when the digital component is not distributed.

As described in more detail below, outcome likelihood predictions provided by machine learning models can be used to determine the incremental outcome likelihood before the digital component is distributed in response to a particular request. This determination can then be used to determine whether to distribute the digital component in response to the particular request and/or what eligibility value will be used for purposes of determining whether to distribute the digital component in response to the particular request.

Referring again to modeling system 110, in some implementations, system 110 includes predictive modeling systems that analyze a variety of data for purposes of determining the incremental outcome likelihood that will be provided by distribution of a digital component (e.g., the likelihood of the given outcome occurring when the digital component is distributed relative to the likelihood of the given outcome occurring absent distribution of the digital component). A back-end server 114 of the system 110 can include multiple different predictive modeling systems that receive and analyze various types of data (described below) in order to generate predictions as to the outcome likelihood under certain conditions. The data can be received via network 120 and may relate to user interaction with digital components and/or electronic documents generated for display as a webpage viewable using web browser 106.

Regarding data analysis, each modeling system of back-end server 114 can execute computing logic for training an artificial neural network that performs deep-learning analytics based on analysis of the data. Trained neural networks can be used as data models for generating predictions and inferences about user tendencies. As described in more detail below, these predictions and inferences are used by modeling system 110 to determine probabilities that quantify a likelihood that a given outcome will occur given a particular set of conditions. While artificial neural networks are described herein as an example machine learning technique, multiple other techniques, such as heuristic, statistical, or machine learning models, can be used to perform the data predictions and data modeling functions described in this document.

Front-end server 112 can be a component such as a client computer having a graphical user interface or other application program(s) (e.g., web browser) through which a user/third-party can interact with system 110. For example, front-end server 112 is configured to exchange data communications with third-party interface 116 to receive data inputs such as target data 118 that are received from digital component providers. Third-party interface 116 can be an example user/mobile computing device, client computer, or any combination of software, middleware, or related front-end components.

Target data 118 can be specified in the form of a target score or other performance metric that is used to adjust the eligibility value based on the incremental outcome likelihood determined by machine learning models of system 110. In some instances, the target score can be a percentage value of the eligibility value. For example, the eligibility value can be 100 and the target score can be 20, where the target score is 20% of the eligibility value (e.g., 100). In some implementations, the target score indicates an expected gain (e.g., commercial gain such as revenue return) from a given outcome and the eligibility value defines a threshold value for controlling transmission of a digital component to the client device 104.

The relationship between the target score and the eligibility value can be structured such that a specified target score (e.g., a revenue return from occurrence of a given outcome) is obtainable through more efficient resource spend. The improved efficiencies are realized when an eligibility value is adjusted, as described herein, to better account for incremental outcome likelihoods that are provided by distribution of a digital component. For example, a content provider can expend commercial resources to cause transmission of a digital component to client device 104 to increase the likelihood that a given outcome will occur.

The eligibility value can represent the amount of commercial resources being expended (e.g., 50). The content provider can obtain or realize a desired revenue return (e.g., target score of 10%) in response to the outcome occurring. However, in some situations, transmission of the digital component may have a negligible impact on causing occurrence of the given outcome. Because eligibility values can represent a resource spend to cause, or control, transmission of digital components, the described teachings provide options for adjusting eligibility values to obtain desired target scores (or revenue returns) with improved resource spend efficiency.

Figure 2:
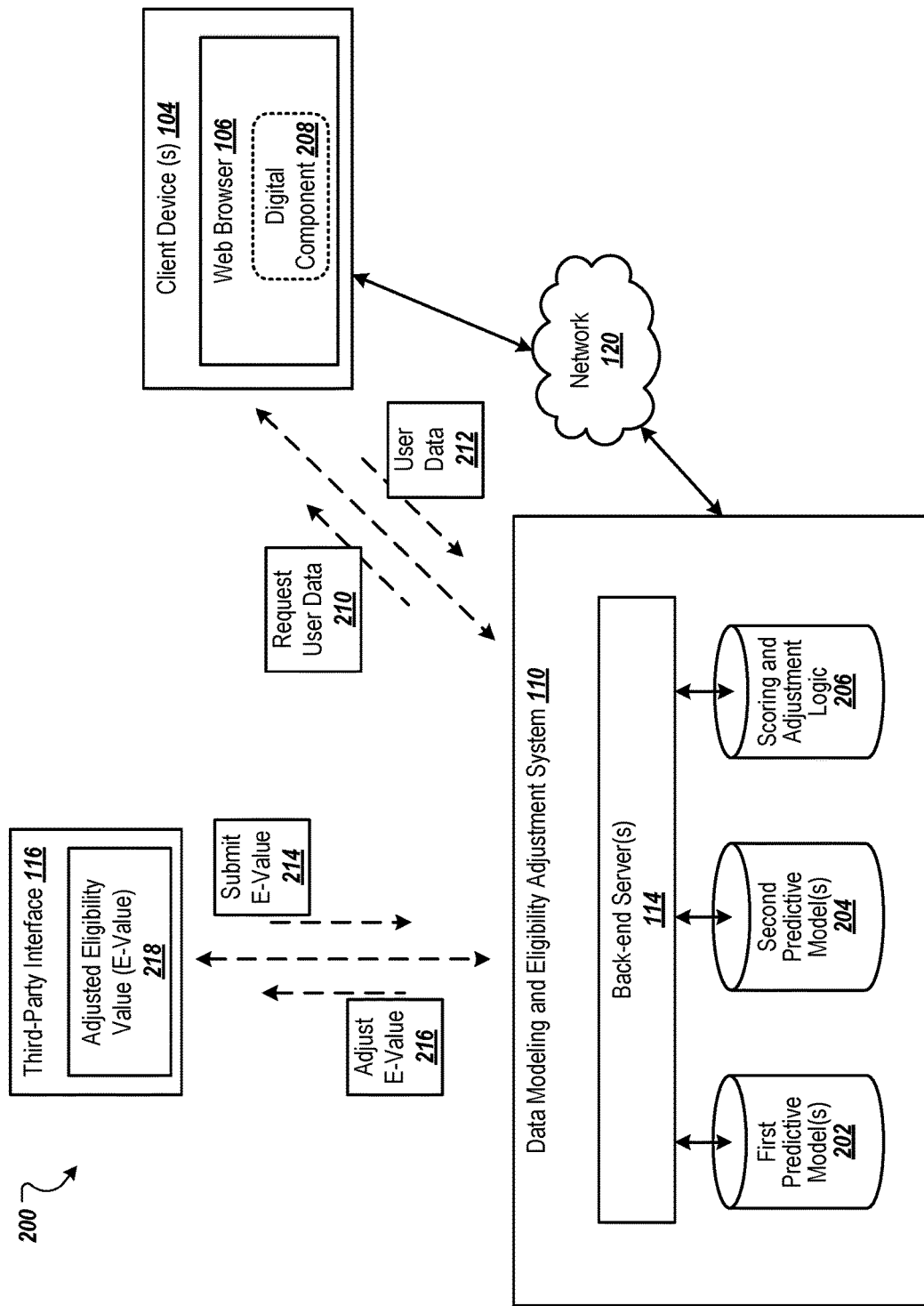
FIG. 2 is a block diagram of an example computing system of the environment of FIG. 1.

FIG. 2 is a block diagram of an example computing system 200 of the environment 100. System 200 can correspond to a sub-system of system 110 and includes at least one back-end server 114. System 200 can be a digital content provisioning network (e.g., an advertiser network) that analyzes user data and, based on this analysis, controls provisioning or transmission of digital components to client device 104. As described in more detail below, system 200 is configured to use data models to predict the occurrence of certain item or conversion related outcomes based on analysis of the user data.

System 200 includes a first predictive model 202, a second predictive model 204, and computing logic 206. First predictive model 202 and second predictive model 204 correspond to model outputs produced when predictive modeling systems of back-end server 114 train artificial neural networks of system 110. Hence, first predictive model 202 and second predictive model 204 may be trained neural networks that are used as data models to generate predictions and inferences for determining the incremental outcome likelihood provided by distribution of a digital component 208. As noted above, in addition to artificial neural networks, multiple other techniques, such as heuristic, statistical, or machine learning models, can be used to perform the data predictions and data modeling functions described herein.

The neural networks (or other learning systems) can be trained based on multiple datasets that include data about user interaction with electronic documents and digital components 208 displayed using web browser 106. For example, the data can include specific keywords associated with the electronic document or entities (e.g., people, places, or things) that are referenced by the electronic document. In some implementations, system 110 transmits a request 210 to multiple different client devices 104 to obtain data about how different users interact with the electronic documents and digital components 208.

The client devices 104 can respond by providing or transmitting user data 212 to system 110 in response to receiving the request 210. In some implementations, conversion data is provided to modeling system 110 as user data 212 to facilitate training a machine learning system to predict whether a user is likely to convert, or initiate conversion of, certain items displayed using web browser 106. In some instances, the conversion data can also include a search query that was submitted from the client device 104 to obtain a search results page. The data can also include conversion data related to other information, such as information that a user of the client device 104 has provided, or geographic information indicating a state or region in which the user resides.

In some implementations, the user data 212 includes other information that provides context for the environment in which digital component 208 will be displayed. For example, this context data can include a time of day of a component request 122, a day of the week of the component request 122, a type of client device 104 at which the digital component 208 will be displayed, such as a mobile device or tablet device. Upon completion of the neural network (or other learning system) training, models 202 and 204 can be used to accurately predict outcome likelihoods as it relates to a digital component 208 being shown, or not shown, to a user.

System 200 uses models 202 and 204 to generate probability values that quantify a likelihood that a given outcome will occur. For example, system 200 can use models 202 and 204 to predict the outcome likelihood of a given outcome, e.g., a user interaction with a particular portion of a web page or completion of a specified transaction at the web page. The predictions generated by the system 200 can include the likelihood of occurrence of an outcome with, and without, user interaction with a particular digital component 208.

In some implementations, the digital component 208 may include graphical representations of data such as items of media content 132-A and 132-B. Upon interaction with the digital component 208, graphical data included in media content 132-A, 132-B may influence or trigger the user to perform an action (e.g., user interaction with the media content 132-A, 132-B) which directs the user to a landing page linked to by the media content 132-A, 132-B and leads to occurrence of the outcome (e.g., completing a purchase at the landing page or another specified outcome such as downloading an application).

Outcomes that are modeled can include item conversions or procurements that would occur at a webpage following user interaction with a digital component (e.g., a digital advertisement) when the component is transmitted to client device 104 in response to an identified opportunity. Likewise, outcomes that are modeled can also include item procurements that occur at a webpage without user interaction with a digital component being transmitted to client device 104 in response to an identified opportunity.

For example, modeling system 110 can run predictive models 202 that include a predicted click-through rate model (pCTR) and a predicted Conversion Rate model (pCvR). Both models (pCTR and pCvR) are used to generate a probability value that quantifies a predicted likelihood of an outcome (e.g., item conversion) given distribution of a digital component 208 followed by user interaction with the digital component 208. For example, the outcome can be user purchases of an item within a particular time window, e.g., 30 days, following the user interaction with the digital component 208 that was displayed at the client device 104.

Modeling system 110 can also run a predictive model 204 that includes a pCvR model that generates a probability value quantifying a predicted likelihood of an outcome (e.g., item conversion) given no digital component 208 being displayed at the client device 104. For example, the pCvR model can predict a likelihood of a conversion from any given user within the same time window (e.g., 30 days), given no presentation of the digital component 208.

An example use case can include an online advertisement auction where, for each time a user is eligible to be presented a digital component 208 at the client device 104, modeling system 110 generates two prediction parameters. A first parameter, produced by model 202, indicates a first probability of user conversion given the digital component 208 being presented to the user and the user clicking or otherwise interacting with the digital component 208. A second parameter, produced by model 204, indicates a second probability of user conversion given no presentation of the digital component 208 at the client device 104.

The first probability and the second probability can be used by system 200 to account for, or differentiate between, the likelihood of a given outcome occurring when the digital component 208 is distributed and the likelihood that the given outcome would have occurred in the absence of the digital component 208 being distributed. For example, modeling system 110 can use back-end server 114 to determine a ratio of the first probability relative to the second probability. In particular, the first probability of a conversion given by model 202 (e.g., the first parameter value) is divided by the second probability of a conversion given by model 204 (e.g., the second parameter). This ratio represents the "incremental outcome likelihood" discussed above and can correspond to an outcome incrementality factor (or parameter) that quantifies an incrementality of a conversion.

Incrementality of a conversion corresponds to how much more likely a user is to convert or procure an item if digital component 208 is presented to the user (and interacted with by the user) at the client device 104 versus if digital component 208 is not presented to the user. As used herein, user conversion or procurement can be incremental if system 200 determines that a user is less likely to convert without interaction with digital component 208 being presented to the user at the client device 104. In some implementations, truly "incremental" conversions correspond to outcomes that have a significantly higher probability of occurring given that a user was presented and/or interacted with the digital component 208 than a scenario in which digital component 208 is not presented to the user.

As discussed above, digital components 208 can be transmitted based on some eligibility value received at system 110, e.g., value 126 received from interface 116, as shown in FIG. 1. System 200 can adjust the eligibility value 126 to account for incremental increases in the likelihood of an event occurring that is caused by the distribution of the digital component 208. In some implementations, system 110 provides an adjusted eligibility value 128 (FIG. 1) to interface 116 for presentation to digital component providers and for use in controlling transmission of digital components 208 for presentation at the client device 104.

System 200 can use the outcome incrementality factor (e.g., the computed ratio of the first parameter and the second parameter) to trigger adjustment of an eligibility value that controls transmission of digital components 208 to client device 104. In some situations, an entity (e.g., an advertiser) can submit eligibility values, e.g., value 126 of FIG. 1, to cause digital components 208 to be transmitted to the client device 104.

The eligibility value be can a pecuniary amount (e.g., a bid amount) an entity will expend to transmit the digital component 208 to achieve a desired conversion outcome (e.g., earn a target score or realize some commercial gain). The conversion outcome is achieved when a user converts an item following interaction with the digital component 208 presented at client device 104. System 200 executes computing processes to adjust eligibility values to better account for conversions that are more "incremental." Such adjustments enable entities to efficiently expend pecuniary resources to cause transmission of digital components 208 to achieve a given outcome.

Providers of digital content can enter, and use, eligibility values for incremental conversions in multiple ways. First, eligibility values for incremental conversions can be received by interface 116 and used as a bid to indicate a pecuniary amount the digital content provider is willing to expend for a conversion that is deemed to be truly "incremental." As indicated above, truly "incremental" conversions can be outcomes that have a significantly higher probability of occurring given that a user was presented and/or interacted with the digital component 208 than a scenario in which digital component 208 is not presented to the user.

Second, eligibility values for incremental conversions can be received by interface 116 and a computed incrementality factor can be used as a bid multiplier that is adjustable based on a predicted incrementality of a conversion. An incrementality factor that can be used as a bid multiplier offers the advantage of allowing digital content provider to gradually tune a multiplier to adjust resource expenditures for more incremental conversions. For example, use of an adjustable bid multiplier allows content providers to specify percentage increases to a submitted eligibility value for more incremental conversions (e.g., bidding up to 2%, 5%, or 10% more for conversions that are believed to be truly incremental).

Third, eligibility values and target data 118 can be received by interface 116 and the eligibility value can be used to adjustable based on a computed incremental outcome likelihood (e.g., incrementality factor) that predicts the incrementality of a conversion. In particular, target data 118 can be specified in the form of a target score or other performance metric and the eligibility value is adjusted based on the incremental outcome likelihood determined by machine learning models of system 110.

The adjusted eligibility value enables the digital content provider to earn the target score with efficient resource spend because the eligibility value is adjusted to reflect the extent to which displaying the digital component causes the given outcome to occur. Stated another way, this target incremental return on expenditure approach involves adjusting an eligibility value to discount, or reduce, bid amount for conversion outcomes that are not as incremental (e.g., discounting bid to account for minimal increase in likelihood of conversion from presenting the digital component 208 relative to the target/desired revenue return from occurrence the given outcome).

For example, modeling system 110 can adjust an eligibility value to achieve the desired target score based on probability values determined by models 202 and 204. Logic 206 can include software instructions and other programmed code for executing scoring and value adjustment features of back-end server 114. In some implementations, modeling system 110 uses logic 206 to adjust an eligibility value based on an outcome incrementality factor for digital component 208. Modeling system 110 can use the incrementality factor to determine an increase or boost in a probability of a conversion that is an outcome of presenting a digital component 208 at client device 104.

For example, prediction data of the models can indicate that there is a 5% chance of a given conversion outcome occurring if no digital component 208 is presented at client device 104 and/or interacted with by the user. However, the prediction data can also indicate that there is a 10% chance of the user converting if digital component 208 is presented at client device 104. In the preceding example, it can be estimated that presenting digital component 208 at client device 104 contributes only a 5% overall increase, or boost, in the likelihood that a given conversion outcome will occur assuming that digital component 208 is presented at client device 104.

Referring to the third approach discussed above for adjusting an eligibility value, a digital content provider can use third-party interface 116 to input an eligibility value that is a cost per incremental conversion bid of $5 (e.g., a target score). An example content provisioning network executing system 200 may adjust (e.g., discount or reduce) the eligibility value to a bid of $0.25 for presenting digital component 208 at the client device 104.

Here, the adjusted eligibility value reflects a more accurate estimation of the contribution to a conversion that is a direct outcome of presenting digital component 208 at client device 104 (e.g., a more incremental conversion). In particular, presenting digital component 208 at the client device 104 for display to a user increased the likelihood of conversion by only 5% (i.e., 5% with no digital component 208 versus 10% with digital component 208). So, the entered eligibility value of $5 is adjusted to $0.25 to indicate an eligibility value that is 5% of $5. Hence, use of the described teachings can enable improved computing and commercial efficiencies by accurately aligning resource expenditures with the revenue return that results from users viewing and/or interacting with digital components 208.

In yet another example, an end user is predicted to have a 5% probability of interacting with a digital component 208 that is presented at the client device 104 for display to a user. Model 202 is used to determine that, after interacting with digital component 208, the user is predicted to have a 50% probability of converting on a publisher or digital content provider's webpage. In some implementations, back-end server 114 includes an electronic user value (eValue) model, e.g., included as part of models 202 and 204, that estimates a pecuniary value of a conversion, or of multiple conversions if more than one conversion is estimated to occur. Assuming at least one conversion occurs, the eValue model may estimate the value of the conversion(s) as $50.

In contrast, model 202 is used to determine or predict that there is a 2.5% likelihood that this user will convert within a particular time window (e.g., 30 days) assuming no digital component 208 is presented at the client device 104, or irrespective of whether digital component 208 is presented at the client device 104. Moreover, the eValue model estimates the value of the conversion(s) at $25 even if no digital component 208 is presented at the client device 104.

Now the expected return from this user, assuming no digital component 208 is presented at the client device 104, is $0.625 (2.5% chance of conversion×$25 estimated conversion value). Alternatively, the expected return assuming digital component 208 is presented at the client device 104 is $1.25, derived from the computation of 5% (likelihood of interacting with digital component 208)×50% (likelihood of conversion after interacting with digital component 208× $50 (eValue)).

For the preceding example, the incremental return from presenting digital component 208 at the client device 104 is: $1.25 (component presented)−$0.625 (no component) =$0.625. A provider of digital content may enter a target data 118 that includes a desired/target incremental return on expenditures of 25%. In other words, for every $1.00 the digital content provider spends, or expends, to cause transmission of digital components to client device 104, the provider would like to realize a revenue return of $1.25 above revenue the provider otherwise would have received from this user. This revenue return is 25% more than the content provider spends to cause transmission of the digital component 208 to influence the likelihood that a given outcome will occur.

For this example, system 110 can adjust an existing eligibility value, or generate an initial eligibility value, to include a pecuniary bid amount of $0.50. By setting the eligibility value, or bid amount, to $0.50 for an estimated incremental return of $0.625, system 110 has satisfied the digital content provider's requirement of 25% return on expenditures for causing transmission of digital components to client device 104.

Figure 3:
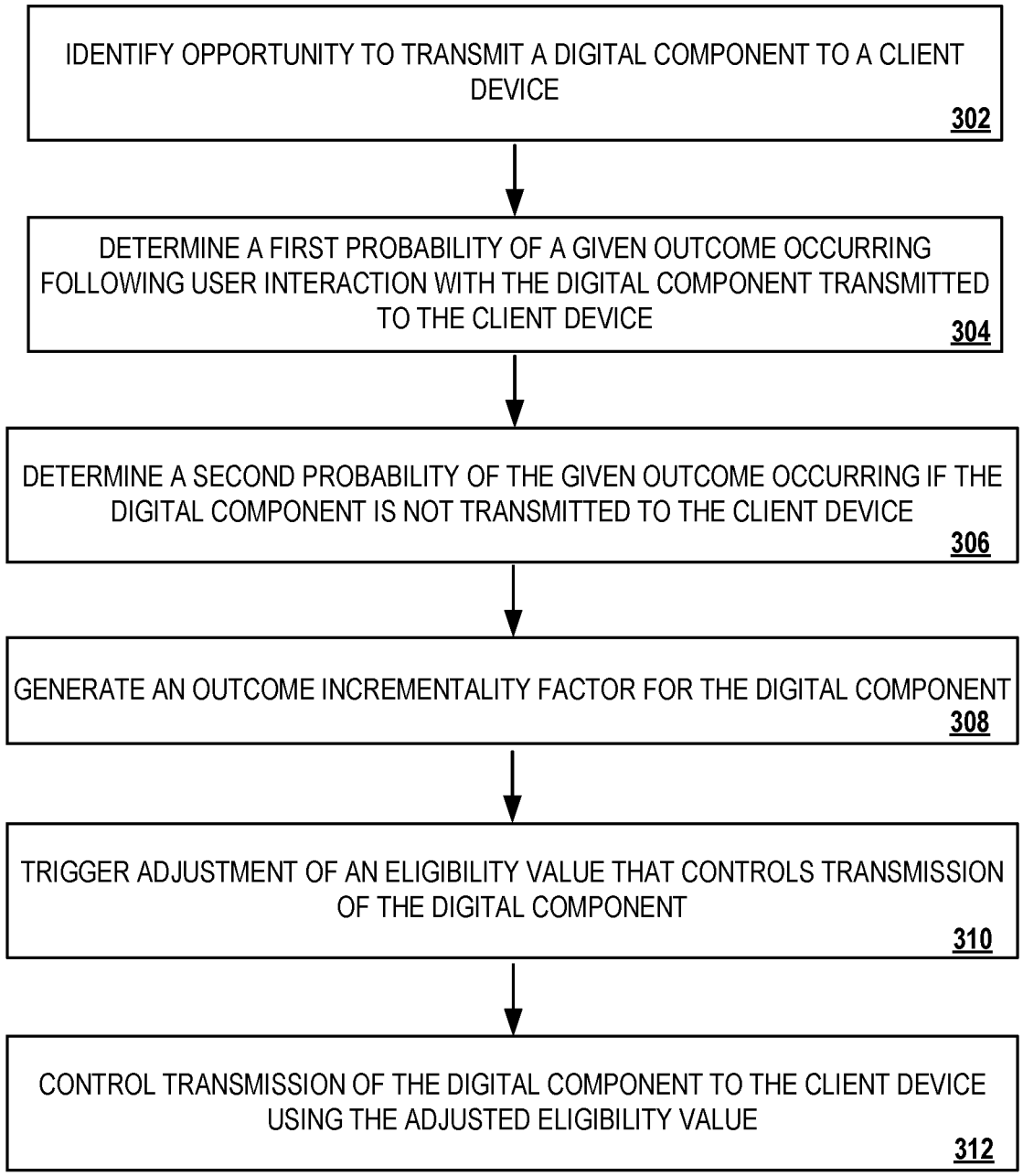
FIG. 3 is a flowchart of an example process for adjusting an eligibility value for transmitting a digital component.

FIG. 3 is a flow chart of an example process 300 for adjusting an eligibility value for transmitting a digital component. Process 300 can be implemented using system 200 described above. Thus, descriptions of process 300 may reference one or more of the above-mentioned components, models, or computational devices of system 200. In some implementations, described actions of process 300 are enabled by computing logic or software instructions executable by a processor and memory of an example electronic device, such as client device 104, system 110, or both.

At block 302 of the process 300, back-end server 114 identifies an opportunity to transmit a digital component to client device 104. For example, back-end server 114 can identify an opportunity to transmit a digital component to client device 104 based on the user data 212 about user interactions with a webpage displayed at client device 104. In some implementations, the opportunity is identified when a user visits particular publisher web pages that are configured to display content to cause completion of a specified transaction.

At block 304, back-end server 114 determines a first probability of a given outcome occurring following user interaction with the digital component assuming that the digital component is transmitted to the client device in response to the identified opportunity. For example, model 202 of server 114 can determine a first probability that the given outcome will occur following user interaction with the digital component assuming that the digital component is transmitted for presentation in a webpage responsive to the request.

At block 306, back-end server 114 determines a second probability of the given outcome occurring assuming that the digital component is not transmitted to the client device in response to the identified opportunity. For example, model 204 of server 114 can determine a second probability that the given outcome will occur assuming that the digital component is not transmitted for presentation in the webpage.

At block 308, the back-end server 114 generates an outcome incrementality factor for the digital component. In some implementations, generating the outcome incrementality factor for the digital component includes determining a ratio of the first probability relative to the second probability. In some instances, generating the outcome incrementality factor comprises determining an extent to which transmission of the digital component changes a probability that the user will perform an action that results in the given outcome.

At block 310, the back-end server 114 triggers adjustment of an eligibility value that controls transmission of the digital component based on the outcome incrementality factor for the digital component. At block 312, the back-end server 114 controls transmission of the digital component to the client device using the adjusted eligibility value.

Figure 4:
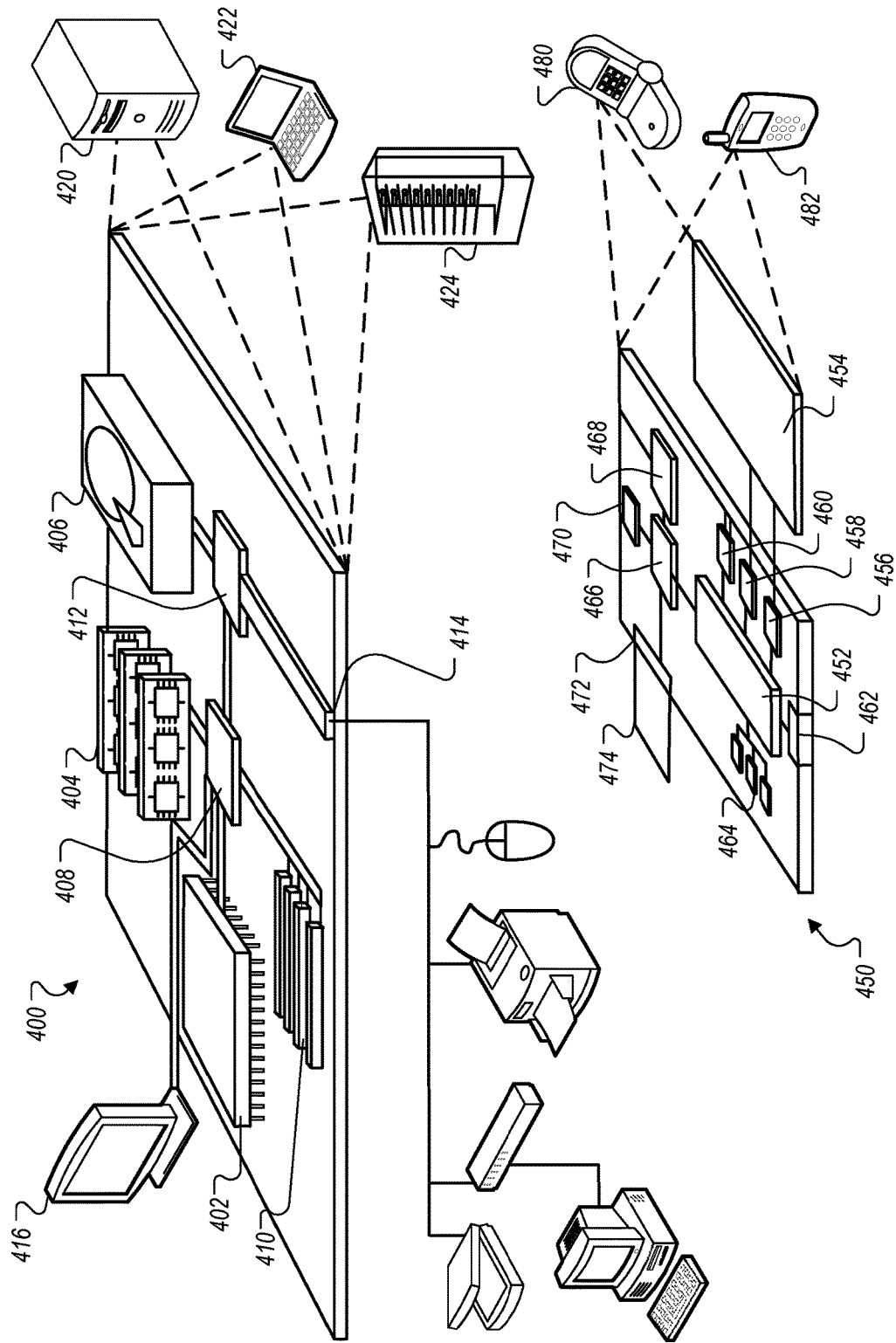
FIG. 4 is a block diagram of a computing system that can be used in connection with methods described in this specification.

FIG. 4 is a block diagram of computing devices 400, 450 that may be used to implement the systems and methods described in this document, either as a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low speed controller 412 manages lower bandwidth-intensive operations. Such allocation of duties is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication (e.g., via a docking procedure) or for wireless communication (e.g., via Bluetooth or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to device 450 through expansion interface 472, which may include, for example, a SIMM card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS receiver module 470 may provide additional wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As discussed above, systems and techniques described herein can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Further to the descriptions above, a user may be provided with controls allowing the user to make an election as to both if and when systems, programs or features described herein may enable collection of user information (e.g., information about a user's social network, social actions or activities, profession, a user's preferences, or a user's current location), and if the user is sent content or communications from a server. In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method, comprising:
    identifying, by a back-end computing server, that a digital component is eligible to be transmitted to a client device in response to receiving a request;
    before transmitting the digital component, determining, by the back-end computing server, a first probability that a given outcome will occur after a user interacts with the digital component if the digital component is transmitted to the client device and presented in a content page displayed at the client device in response to the request;
    determining, by the back-end computing server, a second probability that the given outcome will still occur without transmitting the digital component to the client device in response to the request, wherein the given outcome is distinct from the user interacting with the digital component and involves the user initiating an action other than interacting with the digital component after the digital component is eligible to be transmitted to the client device;

generating, by the back-end computing server, an outcome incrementality factor for the digital component, including determining a ratio of the first probability relative to the second probability;

triggering, by the back-end computing server, adjustment of an eligibility value that controls transmission of the digital component based on the outcome incrementality factor for the digital component; and controlling, by the back-end computing server, transmission of the digital component to the client device using the adjusted eligibility value.

2. The method of claim 1, wherein generating the outcome incrementality factor comprises determining an extent to which transmission of the digital component changes a probability that the user will perform an action that results in the given outcome.

3. The method of claim 1, wherein the back-end computing server includes multiple different predictive modeling systems, and determining the first probability and the second probability comprises:

generating, by a first predictive modeling system, a first parameter that indicates the parameter value for the first probability; and generating, by a second predictive modeling system, a second parameter that indicates the parameter value for the second probability.

4. The method of claim 3, wherein determining the first probability that the given outcome will occur comprises:

determining, by a first model, an interaction probability that quantifies a probability that the user will interact with the digital component if the digital component is transmitted to the client device in response to identifying that the digital component is eligible to be transmitted to the client device;

determining, by a second model, a post-interaction outcome probability that quantifies a probability that the given outcome will occur after the user interacts with the digital component if the digital component is transmitted to the client device in response to identifying that the digital component is eligible to be transmitted to the client device; and determining the first probability as a product of the interaction probability and the post-interaction outcome probability.

5. The method of claim 4, wherein:

determining the second probability of the given outcome comprises determining, by a third model, a baseline probability that quantifies a probability that the given outcome occurs absent transmission of the digital component in response to identifying that the digital component is eligible to be transmitted to the client device; and generating the outcome incrementality factor comprises dividing the first probability by the baseline probability.

6. The method of claim 4, further comprising:

determining, by the back-end computing server and based on the first parameter, a first score for the given outcome in response to transmitting the digital component to the client device;

determining, by the back-end computing server and based on the second parameter, a second score for the given outcome absent transmission of the digital component to the client device; and generating, by the back-end computing server, an incrementality score based on a difference between the first score and the second score.

7. The method of claim 6, wherein the eligibility value corresponds to a particular target score, and triggering adjustment of the eligibility value comprises:

determining a difference between the incrementality score and the particular target score; and adjusting the eligibility value to achieve the particular target score based on the difference between the incrementality score and the particular target score.

8. A computing system, comprising:

a digital component server that stores items of media content and that transmits, to client devices, particular media content included in a digital component;

a back-end computing system, including at least one server, that is in communication with the digital component server, where the at least one server includes one or more non-transitory computer-readable mediums storing instructions executable by one or more processors to cause performance of operations comprising:

identifying, by the back-end computing system, that the digital component is eligible to be transmitted to a client device in response to receiving a request;

before transmitting the digital component, determining, by the back-end computing server, a first probability that a given outcome will occur after a user interacts with the digital component if the digital component is transmitted to the client device and presented in a content page displayed at the client device in response to the request;

determining, by the back-end computing server, a second probability that the given outcome will still occur without transmitting the digital component to the client device in response to the request, wherein the given outcome is distinct from the user interacting with the digital component and involves the user initiating an action other than interacting with the digital component after the digital component is eligible to be transmitted to the client device;

generating, by the back-end computing system, an outcome incrementality factor for the digital component, including determining a ratio of the first probability relative to the second probability;

triggering, by the back-end computing system, adjustment of an eligibility value that controls transmission of the digital component based on the outcome incrementality factor for the digital component; and controlling, by the back-end computing system, transmission of the digital component to the client device using the adjusted eligibility value.

9. The computing system of claim 8, wherein generating the outcome incrementality factor comprises determining an extent to which transmission of the digital component changes a probability that the user will perform an action that results in the given outcome.

10. The computing system of claim 8, wherein the back-end computing system includes multiple different predictive modeling systems, and determining the first probability and the second probability comprises:

generating, by a first predictive modeling system, a first parameter that indicates the parameter value for the first probability; and generating, by a second predictive modeling system, a second parameter that indicates the parameter value for the second probability.

11. The computing system of claim 10, wherein determining the first probability that the given outcome will occur comprises:

determining, by a first model, an interaction probability that quantifies a probability that the user will interact with the digital component if the digital component is transmitted to the client device in response to identifying that the digital component is eligible to be transmitted to the client device;

determining, by a second model, a post-interaction outcome probability that quantifies a probability that the given outcome will occur after the user interacts with the digital component if the digital component is transmitted to the client device in response to identifying that the digital component is eligible to be transmitted to the client device; and determining the first probability as a product of the interaction probability and the post-interaction outcome probability.

12. The computing system of claim 11, wherein:

determining the second probability of the given outcome comprises determining, by a third model, a baseline probability that quantifies a probability that the given outcome occurs absent transmission of the digital component in response to identifying that the digital component is eligible to be transmitted to the client device; and generating the outcome incrementality factor comprises dividing the first probability by the baseline probability.

13. The computing system of claim 11, wherein the operations further comprise:

determining, by the back-end computing system and based on the first parameter, a first score for the given outcome in response to transmitting the digital component to the client device;

determining, by the back-end computing system and based on the second parameter, a second score for the given outcome absent transmission of the digital component to the client device; and generating, by the back-end computing system, an incrementality score based on a difference between the first score and the second score.

14. The computing system of claim 13, wherein the eligibility value corresponds to a particular target score, and triggering adjustment of the eligibility value comprises:

determining a difference between the incrementality score and the particular target score; and adjusting the eligibility value to achieve the particular target score based on the difference between the incrementality score and the particular target score.

15. One or more non-transitory computer-readable mediums storing instructions that, when executed by one or more processors, cause performance of operations comprising:

identifying, by a back-end computing server, that a digital component is eligible to be transmitted to a client device in response to receiving a request;

before transmitting the digital component, determining, by the back-end computing server, a first probability that a given outcome will occur after a user interacts with the digital component if the digital component is transmitted to the client device and presented in a content page displayed at the client device in response to the request;

determining, by the back-end computing server, a second probability that the given first outcome will still occur without transmitting the digital component to the client device in response to the request, wherein the given outcome corresponds to a is distinct from the user interacting with the digital component and involves the user initiating an action other than interacting with the digital component after the digital component is eligible to be transmitted to the client device;

generating, by the back-end computing server, an outcome incrementality factor for the digital component, including determining a ratio of the first probability relative to the second probability;

triggering, by the back-end computing server, adjustment of an eligibility value that controls transmission of the digital component based on the outcome incrementality factor for the digital component; and controlling, by the back-end computing server, transmission of the digital component to the client device using the adjusted eligibility value.

16. The non-transitory computer readable medium of claim 15, wherein generating the outcome incrementality factor comprises determining an extent to which transmission of the digital component changes a probability that the user will perform an action that results in the given outcome.

17. The non-transitory computer readable medium of claim 15, wherein the back-end computing server includes multiple different predictive modeling systems, and determining the first probability and the second probability comprises:

generating, by a first predictive modeling system, a first parameter that indicates the parameter value for the first probability; and generating, by a second predictive modeling system, a second parameter that indicates the parameter value for the second probability.

18. The non-transitory computer readable medium of claim 17, wherein determining the first probability that the given outcome occurring will occur comprises:

determining, by a first model, an interaction probability that quantifies a probability that the user will interact with the digital component if the digital component is transmitted to the client device in response to identifying that the digital component is eligible to be transmitted to the client device;

determining, by a second model, a post-interaction outcome probability that quantifies a probability that the given outcome will occur after the user interacts with the digital component if the digital component is transmitted to the client device in response to identifying that the digital component is eligible to be transmitted to the client device; and determining the first probability as a product of the interaction probability and the post-interaction outcome probability.

19. The non-transitory computer readable medium of claim 18, wherein:

determining the second probability of the given outcome comprises determining, by a third model, a baseline probability that quantifies a probability that the given outcome occurs absent transmission of the digital component in response to identifying that the digital component is eligible to be transmitted to the client device; and generating the outcome incrementality factor comprises dividing the first probability by the baseline probability.

20. The non-transitory computer readable medium of claim 18, wherein the operations further comprise:

determining, by the back-end computing server and based on the first parameter, a first score for the given outcome in response to transmitting the digital component to the client device;

determining, by the back-end computing server and based on the second parameter, a second score for the given outcome absent transmission of the digital component to the client device; and generating, by the back-end computing server, an incrementality score based on a difference between the first score and the second score.

21. The non-transitory computer readable medium of claim 20, wherein the eligibility value corresponds to a particular target score, and triggering adjustment of the eligibility value comprises:

determining a difference between the incrementality score and the particular target score; and adjusting the eligibility value to achieve the particular target score based on the difference between the incrementality score and the particular target score.

22. The non-transitory computer readable medium of claim 21, wherein the particular target score is received at a front-end computing server and specifies a desired performance for the given outcome in response to user interaction with the digital component when the digital component is transmitted to the client device.

\* \* \* \* \*